US008267119B2

(12) United States Patent
Moench et al.

(10) Patent No.: US 8,267,119 B2
(45) Date of Patent: Sep. 18, 2012

(54) VALVE FOR CONTROLLING VOLUMETRIC FLOWS

(75) Inventors: Jochen Moench, Sinzheim (DE); Alois Hils, Sasbach (DE); Georg Reeb, Buehl Eisental (DE); Roland Schmidt, Buehl (DE); Juergen Tempel, Mannheim (DE); Sven Urlaub, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 619 days.

(21) Appl. No.: 12/514,681

(22) PCT Filed: Sep. 20, 2007

(86) PCT No.: PCT/EP2007/059968
§ 371 (c)(1),
(2), (4) Date: Aug. 25, 2009

(87) PCT Pub. No.: WO2008/058792
PCT Pub. Date: May 22, 2008

(65) Prior Publication Data
US 2010/0044606 A1 Feb. 25, 2010

(30) Foreign Application Priority Data
Nov. 13, 2006 (DE) .......................... 10 2006 053 311

(51) Int. Cl.
*F16K 11/074* (2006.01)
(52) U.S. Cl. ................. 137/625.46; 137/339; 251/249.5; 123/41.1; 74/416; 74/425

(58) Field of Classification Search .................. 137/339, 137/625.46, 876; 251/249.5; 123/41.1; 74/412 R, 74/412, 416
See application file for complete search history.

(56) References Cited

U.S. PATENT DOCUMENTS

| 2,245,240 | A | * | 6/1941 | Wittel ............................. 74/425 |
| 2,651,212 | A | * | 9/1953 | Mackmann ..................... 74/425 |
| 2,842,976 | A | * | 7/1958 | Young ............................ 74/425 |
| 3,079,808 | A | * | 3/1963 | Wildhaber ..................... 74/458 |
| 4,224,958 | A | * | 9/1980 | Kaplan et al. ................ 137/340 |

(Continued)

FOREIGN PATENT DOCUMENTS
DE 10061184 A1 6/2002
(Continued)

OTHER PUBLICATIONS
International Search Report PCT/EP2007/059968.

*Primary Examiner* — John Fox
(74) *Attorney, Agent, or Firm* — Michael Best & Friedrich LLP

(57) ABSTRACT

The invention relates to a valve for controlling volumetric flows in a heating and/or cooling system of a motor vehicle, comprising a valve housing (10), from which at least one inlet channel (18) and at least one outlet channel (20, 22) branch, in addition to at least one disc-type valve body (28) for controlling the flow, said body being located in the valve housing so that it can rotate about the axis (31) of a driven shaft (30). According to the invention, the valve body (28) is operatively connected to an electromotive drive (24) by means of a gear system (64). The invention also relates to a heating and/or cooling system (110) of a motor vehicle, comprising a valve (131) of this type.

25 Claims, 5 Drawing Sheets

U.S. PATENT DOCUMENTS

| | | | |
|---|---|---|---|
| 4,438,781 A | | 3/1984 | Brenholt |
| 4,632,150 A | * | 12/1986 | Gagas .................. 137/625.46 |
| 4,930,455 A | | 6/1990 | Creed et al. |
| 5,950,576 A | | 9/1999 | Busato et al. |
| 6,053,061 A | * | 4/2000 | Furukawa et al. ........... 74/89.14 |
| 7,004,453 B1 | | 2/2006 | Cheng |
| 7,370,672 B2 | * | 5/2008 | Lecea et al. .............. 137/625.46 |
| 2006/0102863 A1 | | 5/2006 | Bangert et al. |

FOREIGN PATENT DOCUMENTS

| | | |
|---|---|---|
| DE | 10222758 A1 | 12/2003 |
| GB | 1170463 | 11/1969 |
| RU | 225554 | 3/2004 |
| WO | 2006095088 | 9/2006 |

* cited by examiner

VALVE FOR CONTROLLING VOLUMETRIC FLOWS

BACKGROUND OF THE INVENTION

The invention relates to a valve for controlling volumetric flows in a heating and/or cooling system of a motor vehicle and to a heating and/or cooling circuit of a motor vehicle having a valve of this type.

A cooling or heating circuit of a motor vehicle comprises as a rule a heat source to be cooled, for example the vehicle engine, which is to be cooled by means of a cooling medium by free or forced convection. The temperature difference over the heat source is dependent on the heat input and on the magnitude of the volumetric flow of the coolant, while the absolute temperature of the cooling medium is determined by the heat input of the heat source, the heat discharge via any radiator elements situated in the cooling circuit and the thermal capacities of the involved materials.

In order firstly to protect the internal combustion engine of a motor vehicle against overheating and secondly for it to be possible to use the waste heat of the internal combustion engine, for example for heating the passenger compartment, a coolant which receives the excess thermal energy of the engine and can dissipate it to a desired extent is circulated by pump in motor vehicles. The heating or cooling circuit of a motor vehicle comprises as a rule various part circuits, such as a radiator branch, a bypass branch and/or also a heating heat exchanger branch. The excess heat quantity of the coolant can be output to the surrounding air via a cooler or radiator which is arranged in the radiator branch. Secondly, a heating heat exchanger makes it possible to use the available heat quantity of the coolant to heat the passenger compartment.

The distribution of the coolant flow to the various branches of a cooling or heating circuit of a motor vehicle is controlled here via at least one valve. The desired coolant temperature is set by mixing a cooled and an uncooled coolant flow. Previously, the mixing ratio between the radiator branch and the bypass branch is thus usually regulated with the aid of a thermostat valve which is driven by expandable material and reacts to the coolant temperature. Moreover, motor-driven mixing valves are known.

U.S. Pat. No. 4,930,455 introduces a rotating flap valve for the vehicle sector, which valve is actuated by an electric motor. Said valve in the manner of a butterfly valve regulates the relative volumetric flow through the cooling circuit as a function of an electric control signal which is derived from the cooling water temperature in the described case.

U.S. Pat. No. 5,950,576 has disclosed a proportional coolant valve, the valve element of which is of disk-shaped configuration and has a plurality of through openings which allow the desired connections to be produced between the inlet channel and a plurality of outlet channels. The disk-shaped valve element of U.S. Pat. No. 5,950,576 is set by means of a shaft via an electromechanical actuator according to the demands of an internal combustion engine control unit.

SUMMARY OF THE INVENTION

The regulating valve according to the invention for controlling volumetric flows in a heating and/or cooling system of a motor vehicle is advantageously not coupled to the cooling fluid temperature, but rather, contrary to the widespread thermostat valves, can be regulated by its actuating drive independently of the temperature of the cooling fluid. In particular, the valve according to the invention makes it possible to regulate the volumetric flow according to the characteristic variables which are relevant to the internal combustion engine. The cooling power requirement of the cooling system for an internal combustion engine can therefore be adapted to the power level which is required by the combustion process and, in particular, is independent of the cooling system state.

In the valve according to the invention, a gear mechanism is advantageously provided which produces an operative connection between the electric motor drive of the valve and the valve element which is, in particular, disk-shaped and is to be actuated.

Advantageous developments of the valve according to the invention are possible as a result of the features which are mentioned in the dependent claims.

The gear mechanism which generates the operative connection between the valve element to be actuated and an electric motor drive for the valve is advantageously configured as a spindle drive, for example in particular as a worm gear.

Here, the spindle drive or worm drive is connected to the output shaft of the electric motor drive of the valve. Thus, for example, the spindle drive in the form of a worm drive can be configured directly integrally with the shaft of an electric motor or on it.

Here, the spindle drive, that is to say, for example, a worm drive, meshes with a spur gear or spiral toothed wheel which is connected to the valve element, in particular the drive shaft of the valve element.

The valve according to the invention is advantageously configured as a disk valve and has a disk-shaped valve element which is arranged such that it can be rotated about the axis of a drive shaft and is substantially perpendicular with respect to the axis of the drive shaft of the valve element. In an advantageous configuration of this type of the valve according to the invention, the spur gear or spiral toothed wheel can be configured, for example, integrally with the drive shaft of the valve element or else integrally with the valve element itself. As an alternative, the spur gear or spiral toothed wheel of the worm/spiral toothed wheel gear mechanism of the valve according to the invention can also be pressed onto the drive shaft of the valve element.

The axis of the spindle drive, that is to say, for example, the axis of the worm drive, is advantageously arranged at an axial angle other than 90° with respect to the axis of the drive shaft of the valve element. Here, in particular, angles other than 0° are advantageous and to be realized for the worm mechanism. To this end, the worm mechanism or worm/spiral toothed wheel gear mechanism of the valve according to the invention is advantageously configured in such a way that a straight toothed spur gear or spiral toothed wheel can be used as a result of the oblique position of the worm drive. To this end, the pitch angle (thread) of the worm of the worm drive is selected in such a way that it corresponds exactly to the sum of the axial angle and 90°. In this way, the occurrence of axial bearing forces for the spur gear is avoided and makes rotation-free mounting of the spur gear possible. On account of a capability to be produced more simply with the same precision, the costs of a straight toothed spur gear or spiral toothed wheel are lower than those of a helically toothed spur gear. In addition, a straight toothed spur gear can be aligned more easily, with the result that the gear mechanism for the valve according to the invention also affords an advantage with regard to the quality checks to be carried out.

The configuration according to the invention of the gear mechanism as a worm mechanism or a worm/spiral toothed wheel gear mechanism, in which the valve element, that is to say, for example, a rotary disk, is connected to the worm gear or spiral toothed wheel, for example via a shaft, affords the possibility of keeping particles which are in the cooling fluid away from the gear mechanism via the shaft seal or shaft bearing. The gear mechanism of the valve according to the invention is advantageously configured as a wet running gear mechanism, with the result that the volumetric flow to be regulated washes around it during operation of the valve. In comparison with a spur gear or planetary gear system, the combination worm/spiral toothed wheel has advantages during wet running that the tooth interspaces narrow from the inside to the outside, in relation to the tooth of the spur gear, with the result that the fluid is displaced from the inside to the outside in both directions and, moreover, only low flow speeds are produced. The hydrodynamic losses therefore remain low. In addition, in a worm/spiral toothed wheel gear mechanism, the probability that particles which are present in the fluid are clamped into the contact between the two gearwheels and could therefore contribute to increased wear is reduced by the rotational movement of the worm which takes place laterally with respect to the tooth of the spur gear. A contribution is also made to the insensitivity of the worm/spiral toothed wheel combination in comparison to particles being clamped in by the fact that no large contact area is produced between the gear mechanism elements, but rather only a point load is produced in the ideal case.

The valve element is connected to the preferably electric motor drive via a preferably wet running gear mechanism. Said drive is likewise preferably of wet running configuration. To this end, the gear mechanism can be driven by a brushless DC motor, the rotor of which runs during operation of the valve in the cooling fluid which is to be regulated. Here, the regulating element, that is to say the valve element and preferably a sealing element which is sprung axially on the regulating element form a barrier for keeping the wet running gear mechanism region clean of solids, such as mold sand residues which are found again in the cooling medium on account of the production process of the internal combustion engine components. Moreover, the wet running gear mechanism is protected against contamination via the shaft mounting.

In one alternative embodiment, the sealing function can also be designed in the form of a sliding ring seal with the inclusion of the regulating element, that is to say of the valve element as sliding partner. In this case, the gear mechanism would be called a dry running gear mechanism.

The auxiliary and main circuits are likewise sealed via a hydrodynamic seal between two sliding partners which rotate on one another in conjunction with a hydrostatic prestressing means, with the result that the leakage rates are virtually zero when the cooling circuit is closed. The two circuits, auxiliary circuit (bypass, heating, etc.) and main circuit (heat exchanger), can be arranged both on the inlet side and on the outlet side of the valve.

It is possible by way of the valve according to the invention to realize an advantageous heating and/or cooling circuit for a motor vehicle which permits, in particular, regulation independently of the cooling medium temperature. The cooling power requirement can therefore advantageously be adapted to the power level which is required by the combustion process of the motor vehicle engine.

Further advantages of the valve according to the invention and of a heating and/or cooling system having a valve of this type result from the following description of one exemplary embodiment.

BRIEF DESCRIPTION OF THE DRAWINGS

The drawing shows one exemplary embodiment for the valve according to the invention and for a heating and/or cooling circuit of a motor vehicle which are to be explained in greater detail in the following description. The figures of the drawing, its description and the claims contain numerous features in combinations. A person skilled in the art will also consider said features individually and combine them to form further appropriate combinations.

In the drawing.

DETAILED DESCRIPTION

Figure 1:
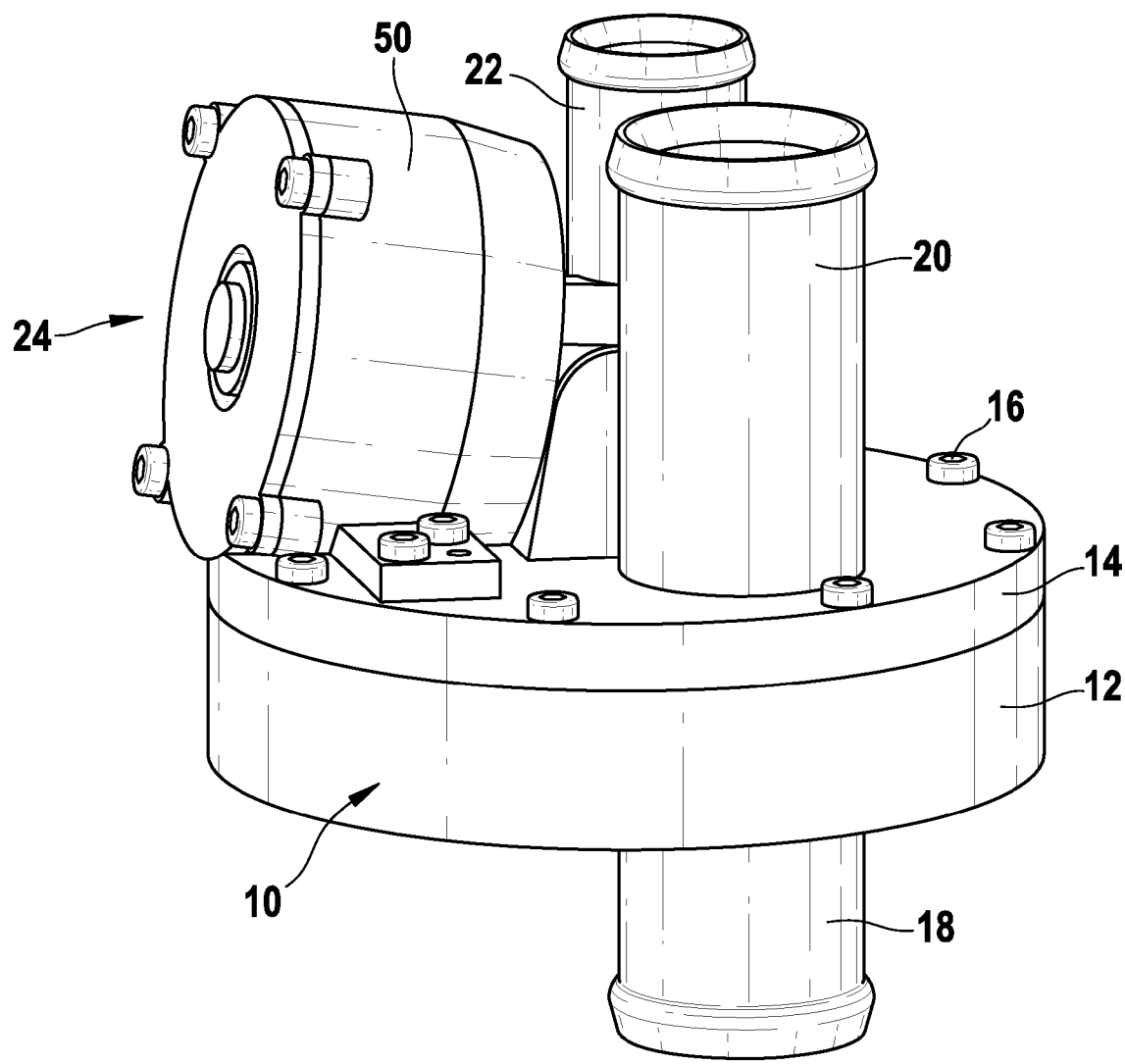
FIG. 1 shows a first exemplary embodiment of a valve according to the invention in a summary illustration.

FIG. 1 shows one example for a valve according to the invention in a summary illustration. The valve according to the invention in accordance with the embodiment in FIG. 1 has a housing 10, with a housing lower part 12 and a housing upper part 14 which are connected to one another in a fluidtight manner via connecting means 16, for example screws, rivets or latching means. In particular, the housing lower part 12 is of substantially cup-shaped configuration, as is shown, in particular, in FIG. 2, and makes it possible to form a valve chamber in its interior for receiving a valve body or valve element. The housing upper part 14 can likewise be of cup-shaped configuration or can be integrally formed on the housing lower part 12 merely as a type of cover. The connection piece 18 of an inlet channel is integrally formed on the housing lower part 12. Here, the inlet channel or the connection piece 18 can be formed, in particular, integrally with the housing lower part, for example can be formed in plastic.

A first outlet channel 20 and a second outlet channel 22 are connected to the housing upper part. With the aid of a valve element which is arranged in the valve chamber and will still be described in greater detail, a connection between the inlet channel and the first outlet channel or between the inlet channel and the second outlet channel can be opened, closed and varied in a desired manner.

Moreover, the valve according to the invention also has an actuating drive 24 for adjusting the valve element. In the exemplary embodiment of the valve according to the invention according to FIG. 1, the actuating drive 24 in the form of an electric motor which is still to be described is fastened to the housing 10, together with a gear mechanism. The electric motor in accordance with the embodiment of the valve according to FIG. 1 has a dedicated housing 50 and is screwed to the housing 10 of the valve. In alternative embodiments, the electric motor can also be arranged directly in the housing 10, for example in the housing lower part 12 or housing upper part 14 of the valve. The drive shaft 27 of the electric motor emerges from the housing 50 of the actuating drive 24, which drive shaft 27 is coupled via a gear mechanism to the output shaft of the valve element of the valve according to the invention. In the valve according to the invention, in a manner which is still to be described, the drive shaft 27 of the electric motor is arranged at an angle other than 90° with respect to the output shaft of the valve element.

Figure 2:
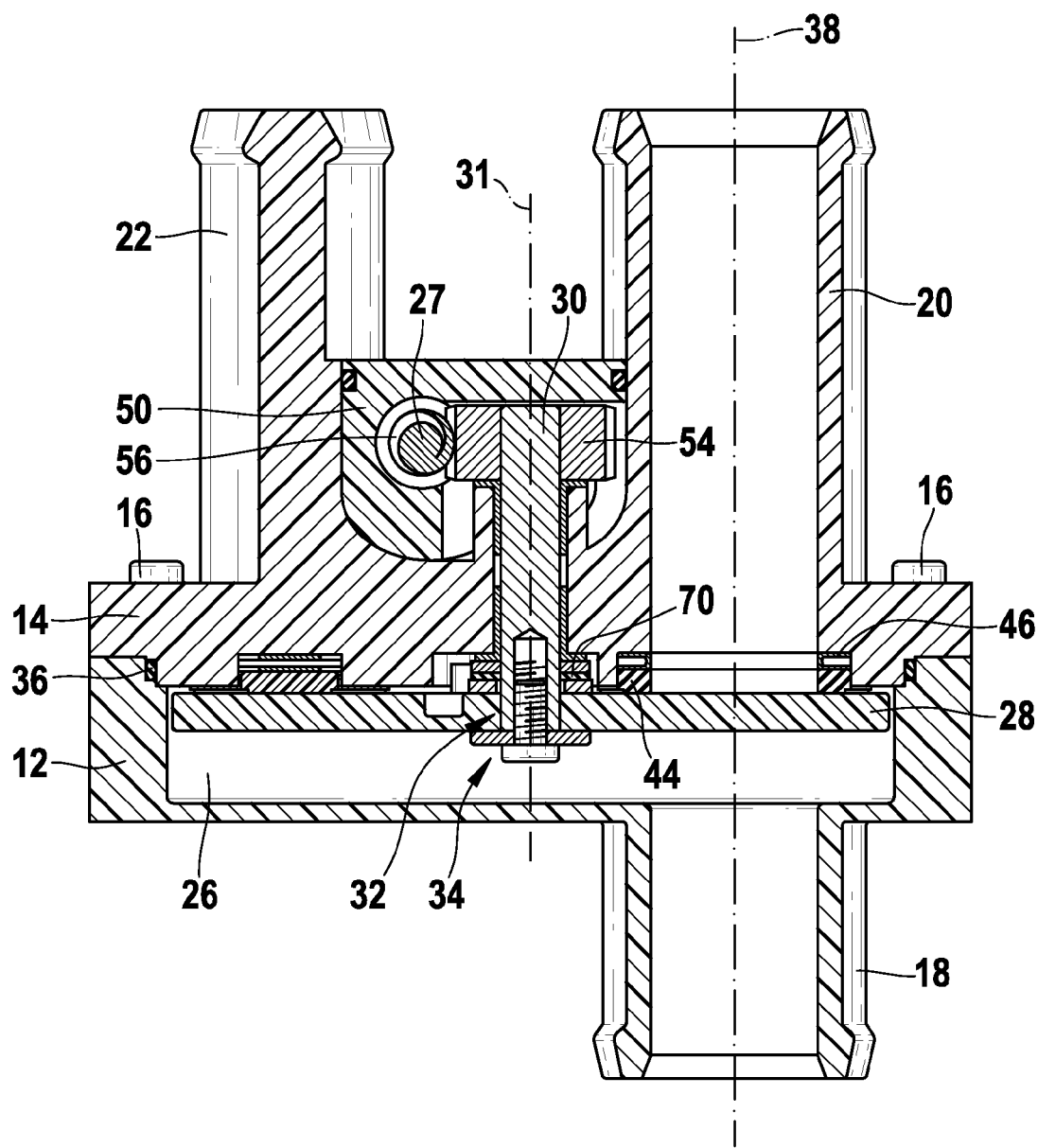
FIG. 2 shows a sectional drawing through the illustration of the valve according to FIG. 1.

FIG. 2 shows a section through the valve according to the invention in accordance with FIG. 1, which section extends approximately perpendicularly with respect to the plane of the drawing of FIG. 1.

A disk-shaped valve element 28 is arranged in the valve chamber 26 which is formed between the housing lower part 12 and the housing upper part 14. An output shaft 30 of the valve element reaches into a central opening of the disk-shaped valve element 28. The valve element 28 is fastened on the output shaft 30 in a rotationally fixed manner by corresponding securing means 34. This can be carried out, for example, by screwing or latching, or else by the output shaft 30 being pressed in the central opening 32 of the valve element 28. A gear connection between the output shaft 30 of the valve element 28 and the driving electric motor ensures the exact adjustment of the valve element via the electric motor drive. The refinement according to the invention of the gear mechanism will be described in detail further below.

Sealing means, for example a sealing ring 36, are provided between the housing lower part 12 and the housing upper part 14, in order to ensure a fluidtight connection between the two housing parts of the valve housing 10. In the exemplary embodiment of FIG. 1 and FIG. 2, the inlet channel 18 is arranged in an aligned manner on a common axis 38 with the first outlet channel 20, and the drive shaft 30 is arranged along an axis 31 which is oriented parallel to the former.

In addition to its central opening for receiving and fastening the output shaft 30, the valve element 28 has regulating contours which are formed as a through opening for the first and second outlet channels of the valve. As a function of the rotary position of the valve element 28, the regulating contours open a cross section to the first and second outlet channels, the size of which cross section is relatively great or relatively small. A fluid which flows in through the inlet channel 18 therefore passes via the valve chamber 26 through the regulating contour into the first outlet channel 20 and into the second outlet channel 22.

The valve interior and, in particular, the first and second outlet channels are sealed via a hydrodynamic sealing means between two sliding partners which rotate on one another in conjunction with s hydrostatic prestressing means, with the result that the leakage rates are virtually zero when the cooling circuit is closed. To this end, the valve according to the invention has sealing elements 44 which are sprung axially on the regulating element, that is to say the valve element 26. The sealing elements, in the form of sealing rings which are shown only in the first outlet channel 20 in FIG. 2, are pressed onto the valve element by spring elements 46, which, for example, can likewise be realized by an annular spring, and therefore seal said valve element in the housing interior.

The valve element 28 and the sealing elements 44 are advantageously produced from material of identical or comparable hardness, in order to avoid, or keep as low as possible, mutual abrasion of said elements. The disk-shaped valve element 28 can advantageously be formed from plastic or a ceramic material. However, other materials are likewise possible, such as coated or alloyed metals or steels or comparable compounds.

In addition to regulating contours for the first and second outlet channels and the central opening 32 for the drive shaft, the disk-shaped valve element 28 of the valve has a further through opening which serves as weight compensating element for compensating for the unbalance of the disk-shaped valve element 28 which can be rotated about the axis 31 of the drive shaft 30. In principle, however, the means for compensating for the unbalance of the disk-shaped valve element 28 can also be configured in other ways. In principle, the means for compensating for unbalance can also be realized by the removal or addition of material, in particular on the valve plate. In particular for the addition of material, that side of the valve plate which faces the inlet channel 18 is possible in one embodiment according to FIG. 2.

A spur gear or spiral toothed wheel 54 is fastened on the drive shaft 30 of the valve element 28 at that end of the drive shaft 30 which lies away from the valve element 28. Said spiral toothed wheel 54 can, for example, be pressed onto the drive shaft 30 or else be configured integrally with the shaft 30 in alternative embodiments. In the case of a plastic shaft, in particular, it is advantageous to configure the spiral toothed wheel 54 directly with the shaft 30. The spiral toothed wheel 54 meshes with the worm 56 of a spindle drive which is configured as a worm drive and is connected to the output shaft 27 of the driving electric motor.

Figure 3:
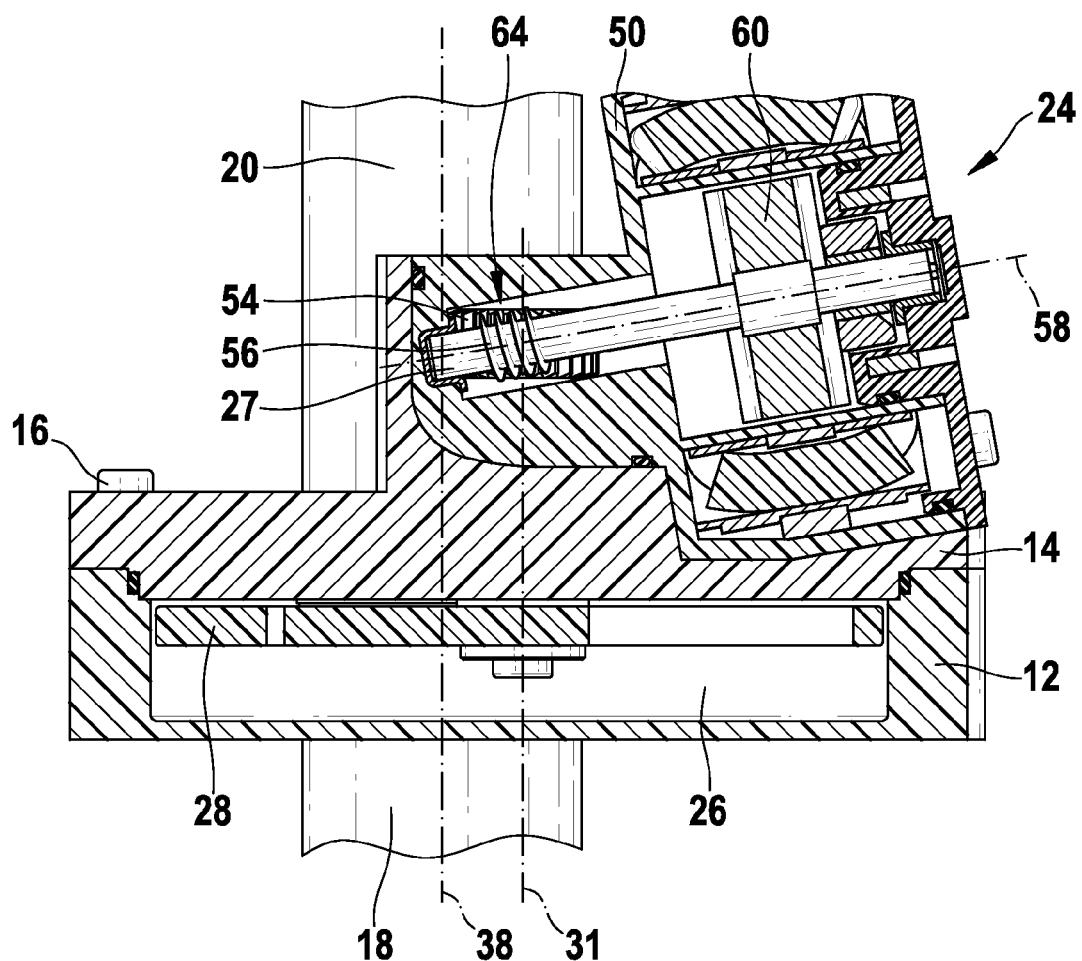
FIG. 3 shows a detailed illustration of a further section through a valve according to the invention, in particular in the region of the gear mechanism.
Figure 4:
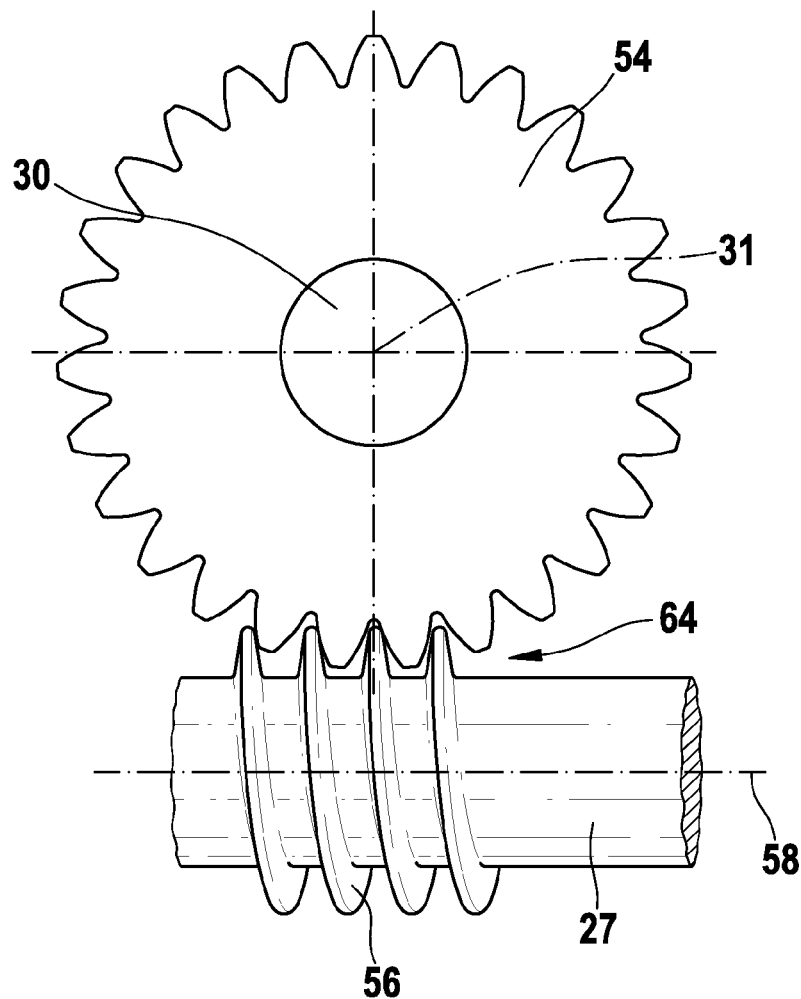
FIG. 4 shows a detailed illustration of the gear mechanism of the valve according to the invention in the form of a worm drive.
Figure 5:
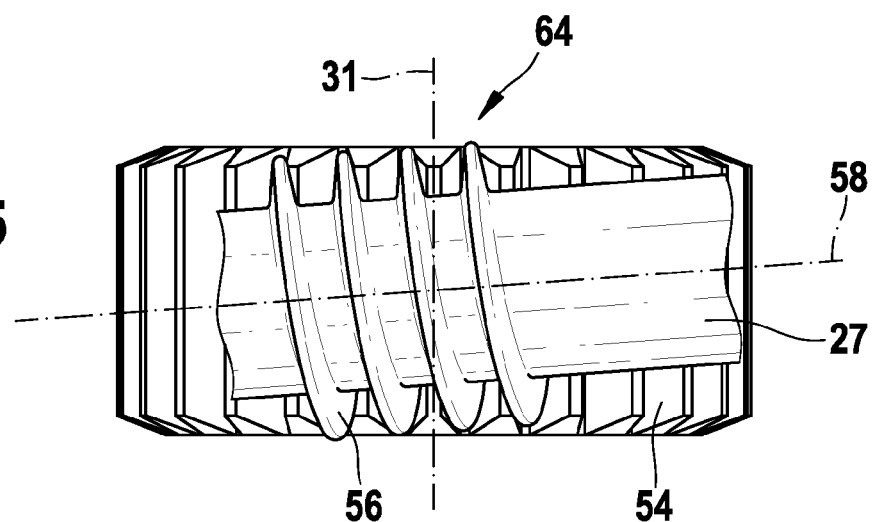
FIG. 5 shows a further detailed illustration of a gear mechanism according to the invention.

Here, the worm or worm/spiral toothed wheel mechanism 32 of the valve according to the invention is advantageously configured in such a way that, as a result of the oblique position of the worm drive (the axial angle is other than 90°), a straight-toothed spur gear 54 can be used (in this regard, see, in particular, the detailed illustrations in FIG. 4 and FIG. 5). To this end, the slope or pitch angle of the worm 56 is selected in such a way that it corresponds as exactly as possible to the sum of the axial angle and a right angle. Here, the axial angle is defined as the angle between the axis of the spindle drive, therefore the axis 58 of the motor shaft 27 in the exemplary embodiment according to FIG. 2, and the axis 31 of the drive shaft 30 of the valve element 28 (in this regard, see also FIG. 3). Here, the axis 31 of the drive shaft 30 of the valve element 28 is advantageously arranged parallel to the aligned axes 38 of inlet channel 18 and outlet channel 20.

FIG. 3 shows the relative orientation of said axes in a detailed illustration of the valve according to the invention. The drive shaft 27 of the driving electric motor extends at an angle other than 90° with respect to the output shaft 30 of the valve element 28 which can be seen in FIG. 3 as a result of its axis 31. The worm 56 which meshes with the spiral toothed wheel 54 which is indicated in FIG. 3 is placed onto the drive shaft 27 of the electric motor drive or formed from it.

The realization of the gear mechanism 64 in the form of a combination of worm/spiral toothed wheel has, in particular, advantages for the wet running operation of the gear mechanism, since the tooth interspaces, as can be seen in FIG. 3 and FIG. 4 (in relation to the tooth of the spur gear), narrow from the inside to the outside, with the result that the fluid is displaced from the inside to the outside in both directions and therefore only low flow speeds are produced. The hydrodynamic losses therefore remain low on the gear mechanism. In addition, in the worm/spiral toothed wheel gear mechanism according to the invention, the probability that particles which are present in the fluid are clamped into the contact between the two meshing gearwheels and could therefore contribute to increased wear is reduced by the rotational movement of the worm which takes place laterally with respect to the tooth of the spur gear. Moreover, this insensitivity of the worm/spiral toothed wheel gear mechanism to the clamping in of particles also results from the fact that large contact faces are not produced, but rather only a point load is produced between the gearwheels in the ideal case.

As is again shown in detail in FIG. 3 and FIG. 4, the worm/spiral toothed wheel gear mechanism 64 is advantageously configured in such a way that, as a result of the oblique position of the worm drive 56, a straight-toothed spur gear 54 can be used. To this end, the slope or pitch angle of the worm 56 is selected in such a way that it corresponds as exactly as possible to the sum of the axial angle and 90°. The occurrence of maximum bearing forces for the spur gear is therefore avoided and mounting of the spur gear 54 without rotation is made possible.

The gear mechanism according to the invention is advantageously a wet running gear mechanism connected to a preferably likewise wet running electric motor drive. Here, the valve element 28 and a sealing element 70 which is preferably sprung axially on the valve element form a barrier for keeping the wet running gear mechanism region clean of solids, for example mold sand, as can be gathered from FIG. 2.

The rotor 60 of a wet running drive of this type could, for example, be formed entirely or partially from rare earth magnets of a rare earth magnetic material of high retentivity. Here, however, the rare earth material should be encapsulated for reasons of corrosion resistance.

The valve housing is likewise sealed with respect to the outlet channels via a hydrodynamic sealing means between two sliding partners which rotate on one another in conjunction with a hydrostatic prestressing means, with the result that the leakage rates can be virtually zero when the coolant circuit is closed.

In the valve according to the invention, as an alternative to the worm/spiral toothed wheel gear mechanism 64, a disk having an external toothing system (straight or oblique spur gear toothing, crown gear toothing) could be used, with the result that a pinion or a worm can act there. In this case as well, the axial angle of the two rotating parts should not be 90°. For example, the disk-shaped valve element itself could advantageously be configured as a gear mechanism element, for example by means of a circumferential toothed rim.

Figure 6:
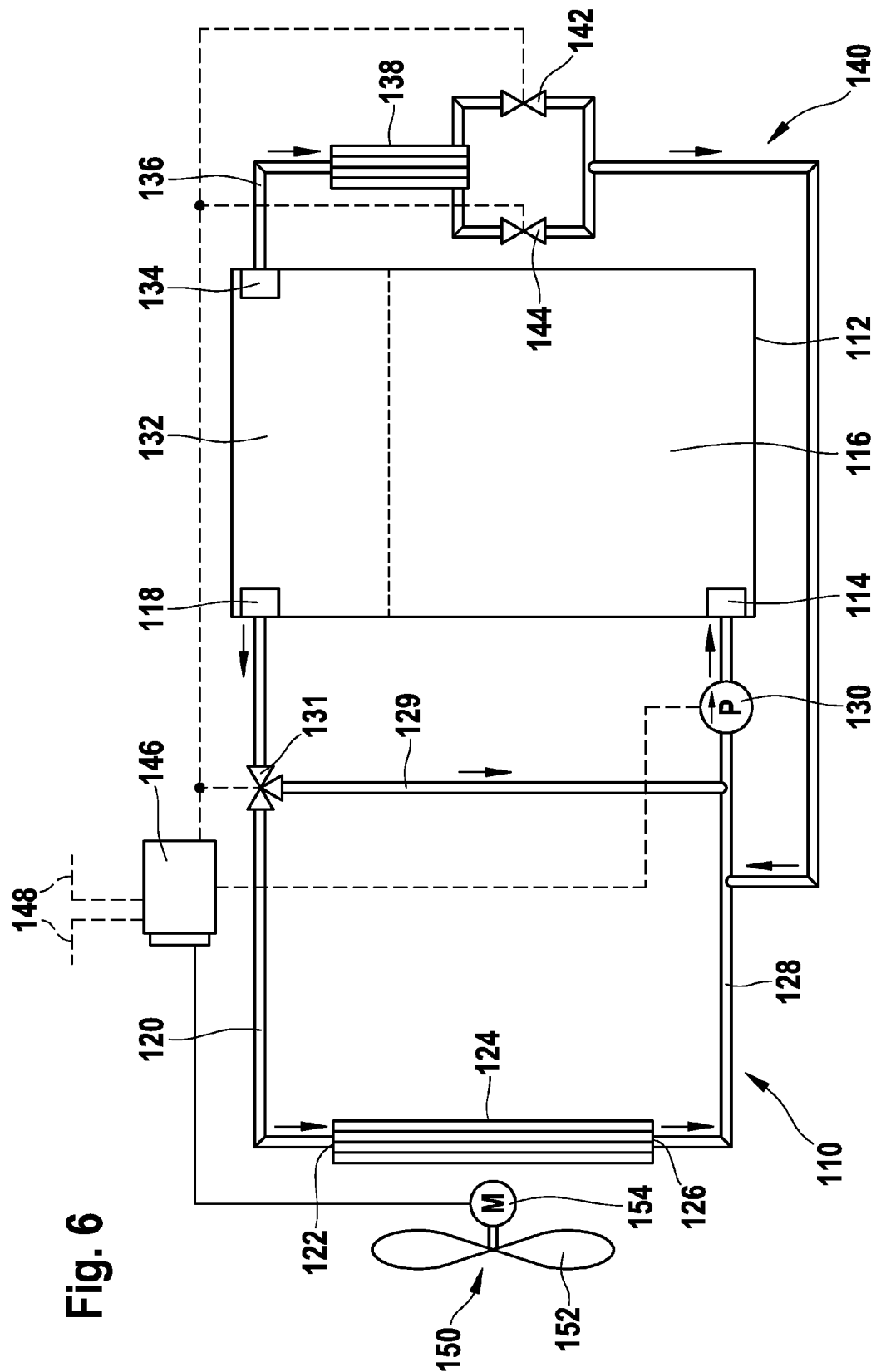
FIG. 6 shows a heating and/or cooling circuit having a valve according to the invention.

In a simplified, diagrammatic illustration, FIG. 6 shows a cooling and heating circuit 110 for cooling an internal combustion engine 112 having a coolant control valve 131 according to the invention. The internal combustion engine 112 has a first coolant inlet 114 in the region of its engine block 116, and a first coolant outlet 118 which is connected via a feed line 120 and a radiator inlet 122 to a radiator 124 of the cooling circuit 110. The radiator 124 is in turn connected via a radiator outlet 126 and a connecting line 128 to the coolant inlet 114 of the internal combustion engine 112.

In order to circulate the coolant in the cooling circuit 110 of the internal combustion engine 112, a coolant pump 130 which is electronically regulated in the exemplary embodiment of FIG. 6 is situated in the connecting line 128. Purely mechanical coolant pumps are likewise possible, however, in other exemplary embodiments for a cooling and heating circuit according to the invention.

A second coolant outlet 134 which is connected via a connecting line 136 to a heating heat exchanger 138 of a heating part branch 140 is situated in the cylinder head 132 of the internal combustion engine 112. In this heating branch 140, part of the heated coolant which emerges from the engine 112 is used, in order to use, via the heating heat exchanger 138, the thermal energy which is stored in the hot coolant for heating, for example of a vehicle interior which is not shown further in FIG. 6. The tailored regulation of the heating function is indicated diagrammatically in FIG. 6 only by the controlled heating valves 142 and 144.

A bypass line 129 which extends parallel to the radiator element 124 and connects the return line 120 directly to the connecting line 128 between the radiator outlet 126 and the coolant inlet 114 of the engine branches off from the return line 120 of the cooling and heating circuit 110. In order to regulate the relative volumetric flows firstly through the radiator element 124 and secondly through the bypass line 129, a three-way bypass valve 131 which is actuated and regulated by a control unit 146 is provided in the exemplary embodiment shown of a cooling and heating circuit according to FIG. 6. Here, the bypass valve 131 is constructed in the manner of the valve according to the invention in accordance with FIGS. 1 to 3.

In the exemplary embodiment of the cooling and heating circuit 110 according to FIG. 4, the heating valves 142 and 144 of the heating part branch 140 are likewise actuated and regulated via the control unit 146, like the bypass valve 131. The control unit 146 which can also be, for example, the engine control unit of the vehicle is connected to various sensors which are not shown in FIG. 6 for the sake of clarity and are indicated merely by electric connecting lines 148. Via said sensors, the control unit 146 is fed current parameters of the cooling circuit and the engine which can then be compared with a calibration which is stored in the control unit, in order therefrom to determine corresponding manipulated variables for the active components of the cooling and heating circuit 110. In addition to the parameters of the cooling circuit 110, such as the coolant temperature, the engine temperature, in particular the engine temperature at various temperature critical locations of the engine, is also transferred to the control unit 146. Moreover, the fuel consumption and the pollutant emissions of the internal combustion engine can be transferred via corresponding sensors to the control unit, as further input signals for the control unit.

In the exemplary embodiment of FIG. 6, the control unit 146 serves at the same time for the tailored actuation of a cooling fan 150 which is assigned to the radiator 124 of the cooling circuit in order to increase the cooling power of the cooling system. The cooling fan 150 comprises a fan 152 and a motor 154 which drives the fan and receives its actuating data and the power supply from the control unit 146 via corresponding, electric connecting lines. Moreover, the control unit 146 also regulates, inter alia, the power of the coolant pump 130.

In detail, the control unit 146 calculates in each case a manipulated variable for the actuators of the valves 131, 142 and 144 and of further valves which are not shown in the simplified illustration of a cooling circuit according to FIG. 6, in order to regulate the current actual engine temperature to an optimum setpoint engine temperature. The actuators of the valves according to the invention of the cooling and heating circuit 110 are actuated in such a way that the volumetric flow which is regulated by the valves is as linearly proportional as possible to the manipulated variable for the respective actuator. In this way, the valves can be actuated exactly according to the stipulations of the control unit, with the result that the coolant volumetric flow can be adapted very accurately to the stipulations, for example of a time-dependent temperature model for the engine which is stored in the control unit 146. In order to set the optimum engine temperature, the relative coolant volumetric flow through the radiator 124 or through the bypass line 129 is regulated with the aid of the controllable valves according to the invention. Thus, for example, the connecting line 120 to the engine radiator 124 can be closed completely in the starting phase of the engine 112, and the bypass valve 131 according to the invention can be opened in the direction of the bypass line 129 optionally completely or else only slightly. In this way, it is possible to reach the optimum working temperature of the engine 112 rapidly, with the result that the operating conditions of lower fuel consumption and lower pollutant emissions of the engine can be achieved early. After the optimum engine temperature has been reached, the radiator feed line 120 is opened by the bypass valve 131 and the bypass line 129 can be closed to a corresponding extent, in order for it to be possible to dissipate the excess thermal energy produced by the engine 112 to the surroundings via the radiator element 124 and the radiator fan 150. It is likewise possible to close both the bypass line 129 and the feed line to the radiator completely at the same time via the bypass valve 131.

The valve according to the invention is not restricted to the embodiments which are shown in the description.

The invention claimed is:

1. A valve for controlling volumetric flows in a heating and/or cooling system of a motor vehicle, having a valve housing (10), from which at least one inlet valve (18) and at least one outlet valve (20, 22) branch, and at least one disk-shaped valve element (28) for volumetric flow regulation which is arranged in the valve housing and can be rotated about the axis (31) of a drive shaft (30), characterized in that the valve element (28) is operatively connected to an electric motor drive (24) by means of a gear mechanism (64), and characterized in that the gear mechanism (64) is a wet running gear mechanism, around which the fluid which is to be regulated flows during operation.

2. The valve as claimed in claim 1, characterized in that the gear mechanism (64) has a spindle drive (56).

3. The valve as claimed in claim 2, characterized in that the spindle drive (56) is operatively connected to a drive shaft (27) of the electric motor drive (24).

4. The valve as claimed in claim 2, characterized in that the spindle drive (56) meshes with a spur gear (54) which is connected to one of the valve element (28) and the drive shaft (30) of the valve element (28).

5. The valve as claimed in claim 4, characterized in that the spur gear (54) is a straight toothed spur gear.

6. The valve as claimed in claim 2, characterized in that an axis (58) of the spindle drive (56) has an axial angle other than 90° with respect to an axis (31) of the output shaft of the valve element (28).

7. The valve as claimed in claim 6, characterized in that the spindle drive (56) is configured as a worm drive (56).

8. The valve as claimed in claim 7, characterized in that a pitch angle of the worm drive (56) is equal to the sum of the axial angle and 90°.

9. The valve as claimed in claim 1, characterized in that the drive shaft (30) of the valve element (28) is arranged substantially perpendicularly with respect to a plane of the disk-shaped valve element (28).

10. The valve as claimed in claim 1, characterized in that the valve element (28) and at least one sealing element (70) which is sprung on the valve element (28) form a solid barrier for solids which are present in the volumetric flow.

11. A valve for controlling volumetric flows in a heating and/or cooling system of a motor vehicle, having a valve housing (10), from which at least one inlet valve (18) and at least one outlet valve (20, 22) branch, and at least one disk-shaped valve element (28) for volumetric flow regulation which is arranged in the valve housing and can be rotated about the axis (31) of a drive shaft (30), characterized in that the valve element (28) is operatively connected to an electric motor drive (24) by means of a gear mechanism (64), and characterized in that the gear mechanism (64) is driven by a brushless DC motor, the rotor of which runs during operation in the cooling fluid which is to be regulated.

12. The valve as claimed in claim 11, characterized in that the gear mechanism (13) has a spindle drive (12).

13. The valve as claimed in claim 12, characterized in that the spindle drive (56) is operatively connected to a drive shaft (27) of the electric motor drive (24).

14. The valve as claimed in claim 12, characterized in that the spindle drive (56) meshes with a spur gear (54) which is connected to one of the valve element (28) and the drive shaft (30) of the valve element (28).

15. The valve as claimed in claim 14, characterized in that the spur gear (54) is a straight toothed spur gear.

16. The valve as claimed in claim 15, characterized in that the rotor is formed at least partially from a rare earth magnetic material.

17. The valve as claimed in claim 16, characterized in that the rare earth magnetic material of the rotor is encapsulated.

18. The valve as claimed in claim 12, characterized in that an axis (58) of the spindle drive (56) has an axial angle other than 90° with respect to an axis (31) of the output shaft of the valve element (28).

19. The valve as claimed in claim 18, characterized in that the spindle drive (56) is configured as a worm drive (56).

20. The valve as claimed in claim 19, characterized in that a pitch angle of the worm drive (56) is equal to the sum of the axial angle and 90°.

21. The valve as claimed in claim 11, characterized in that the drive shaft (30) of the valve element (28) is arranged substantially perpendicularly with respect to a plane of the disk-shaped valve element (28).

22. The valve as claimed in claim 11, characterized in that the valve element (28) and at least one sealing element (70) which is sprung on the valve element (28) form a solid barrier for solids which are present in the volumetric flow.

23. A valve for controlling volumetric flows in a heating and/or cooling system of a motor vehicle, having a valve housing (10), from which at least one inlet valve (18) and at least one outlet valve (20, 22) branch, and at least one disk-shaped valve element (28) for volumetric flow regulation which is arranged in the valve housing and can be rotated about the axis (31) of a drive shaft (30), wherein the valve element (28) is operatively connected to an electric motor drive (24) by means of a gear mechanism (64), wherein the gear mechanism (64) is a wet running gear mechanism, around which the fluid which is to be regulated flows during operation, and wherein the gear mechanism (64) is driven by a brushless DC motor, the rotor of which runs during operation in the cooling fluid which is to be regulated.

24. The valve as claimed in claim 23, characterized in that the rotor is formed at least partially from a rare earth magnetic material.

25. The valve as claimed in claim 24, characterized in that the rare earth magnetic material of the rotor is encapsulated.

* * * * *